Patented Dec. 27, 1949

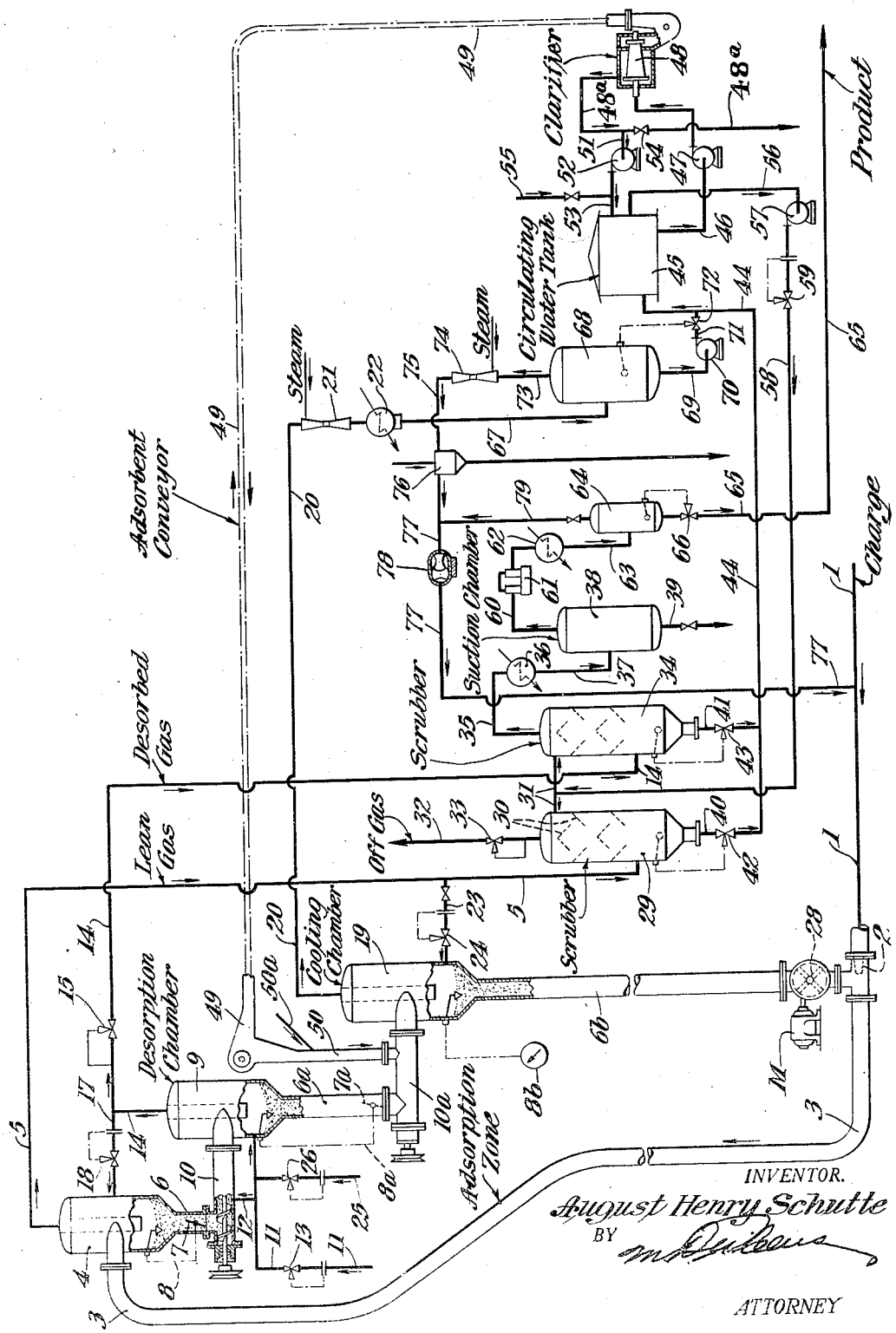

2,492,401

UNITED STATES PATENT OFFICE 2,492,401

GAS ADSORPTION

August Henry Schutte, Hastings on Hudson, N. Y., assignor to The Lummus Company, New York, N. Y., a corporation of Delaware Application February 24, 1945, Serial No. 579,636

17 Claims. (Cl. 183—4.2)

This invention relates to improvements in the art of separating a gas from a mixture of gases by contact of the mixture with a solid adsorbent material in a divided state. More particularly, the invention relates to improvements in an adsorption system wherein contact is effected between the gaseous mixture and the adsorbent for selective adsorption of a gas of the mixture and wherein the adsorbent is subsequently heated to effect desorption of said gas and then cooled to an optimum temperature for performance of the adsorption step and reemployed in said step.

It is customary in such a system to heat and cool the adsorbent in an inefficient and costly manner by indirect heat exchange. An adsorption system of large capacity requires many thousands of square feet of heat exchange surface entailing great cost of plant equipment, much servicing and often suspension of plant operation during servicing. Moreover, indirect heat exchange is especially inefficient in such a system because of the fact that heat exchange must occur largely by condition between the solid adsorbent and the temperature-conditioning fluid. Consequently, excessive area of heat exchange surface is required.

An important object of the present invention is to provide for more efficient performance of said heating and cooling and obtain substantial economy in plant equipment and in cost of operation and maintenance.

Another object of the invention is to provide for satisfactory performance of the heating and cooling by direct heat exchange.

Other objects and advantages of the invention will be apparent from the following description thereof taken in connection with the accompanying drawing which is a diagrammatic illustration of a preferred form or embodiment of the invention in a continuous gas adsorption system employing a finely divided or powdered solid adsorbent material.

It is to be understood that this improved system is applicable to the separation by adsorption of any desired gaseous component of a mixture of gases and that in the following specification and claims the term "gases" is meant to include vapors.

This application is a continuation-in-part of my similarly-entitled copending application, Serial No. 504,275, filed September 29, 1943, now Patent No. 2,397,566.

The disclosed adsorption system is suitable for handling any one of a variety of charges such, for examples, as natural gas, for obtaining a desired component therefrom, or the gaseous products from cracking, for obtaining separation therefrom of a desired component such as ethylene, propylene, etc.

According to the present invention the adsorbent material is passed continuously in succession through an adsorption zone, a desorption zone, a cooling zone and back to the adsorption zone. Within the adsorption zone the adsorbent is commingled with a continuous charge stream of the gases to be separated. Within the desorption zone, the adsorbent bearing the adsorbed component of the charge mixture is directly heated to a required temperature for desorption by introduction of hot vapor. At least a portion of said vapor is condensed upon the adsorbent and the latter, bearing the condensate of the vapor, is passed to the cooling zone. A low pressure condition is maintained within the cooling zone to cause evaporation of said condensate and thereby effect direct cooling of the adsorbent to a temperature suitable for reemployment thereof within the adsorption zone. In the course of passage thereof from zone to zone, the adsorbent is constrained to form a gravity-packed sealing mass thereof between each zone and the immediately following zone and thereby maintain required pressure differentials between the zones. Provision is also made for efficient recovery of adsorbent entrained by the gases discharged from the adsorption zone and the desorption zone and also for recovery of any fixed gas evacuated from the cooling zone along with the vaporized condensate.

In the operation of the system, the charge is continuously introduced into the system through a line 1 which discharges through an injection nozzle 2, into one end of an elongated chamber 3 defining an adsorption zone. The finely divided adsorbent, such as powdered charcoal or silica gel, for examples, is introduced at the point of charge injection and is carried by the charge stream through the adsorption zone. In its passage through said zone the adsorbent becomes distributed through the charge for maximum adsorption contact therewith. Desirably, a pressure of approximately 5 lbs. gauge and a temperature of not over 160° F. are maintained within the adsorption zone. The contact chamber discharges into a separator 4 of the well-known "cyclone" type. In effect, this separator forms a continuation of the adsorption, or contact, zone since contact continues throughout a portion of the travel of gaseous medium through the separator. Within the latter the adsorbent, bearing the adsorbed gas, is centrifugally separated from the gaseous medium and falls to the bottom of the separator casing, while the lean gaseous medium is passed from the top of the separator through the line 5.

At its bottom the separator 4 opens into a vertical conduit 6 which receives the separated adsorbent and constrains it to form a gravity-packed column. The packed mass of adsorbent so formed serves as a seal to prevent exchange of gas between the adsorption zone and a following desorption zone and maintain a required pressure differential between said zones. In order to maintain a sufficient depth of the adsorbent for sealing effect, the conduit 6 is provided with a damper or butterfly valve 7 to control discharge of the adsorbent from the conduit. Through a connection 8 of any well-known type, the valve is operated in response to variations in the level of the accumulated adsorbent at the bottom of the separator. A cyclone separator 9 forms a chamber defining the desorption zone, and a lateral screw conveyor 10 delivers the used adsorbent from the lower end of the tube 6 to said zone. The screw of the conveyor is power-driven through a pulley at the outer end thereof.

Adsorbent delivered by the conveyor 10 is heated by direct heat exchange with a hot vapor to effect desorption. For that purpose a hot vapor such as steam, for example, is introduced into the conveyor and into separator 9, through lines 11 and 12, line 12 being provided with a conventional flow control valve 13. The heat provided by the steam so supplied causes desorption of the gas from the adsorbent and at least a portion of the steam is condensed upon the adsorbent. Within the separator 9 the release gas and the delivered adsorbent are whirled to separate the latter which falls to the bottom of the separator casing while the gas escapes through the overhead line 14. Desirably a pressure of approximately 7 to 10 lbs. gauge, and a temperature of approximately 230° F. are maintained within the desorption zone. such pressure is maintained by a pressure-controlled valve 15 in the line 14, and the temperature is maintained through control of steam admission by the flow control valve 13 in the steam line 11. In order to control the degree of saturation and to improve the selectivity of the adsorbent within the adsorption zone a controlled amount of the desorbed gas is returned to said zone for readsorption. For that purpose, a branch line 17 leads from the line 14 to the separator 4 and is provided with a flow control valve 18.

A seal-forming means similar to that previously described herein is provided at the lower end of the separator 9. This means includes a vertical conduit 6a to receive the separated adsorbent, a butterfly valve 7a and a control connection 8a for operating the valve in response to variations in the level of the adsorbent at the lower end of the separator 9, to maintain a depth of the adsorbent sufficient to maintain the required pressure differential between the desorption zone and a following cooling zone.

A cyclone separator 19 forms a chamber defining the cooling zone, and a screw conveyor 10a, similar to conveyor 10, continuously delivers the adsorbent from the column 6a to the cooling zone. Through a line 20 provided with a steam jet ejector 21, discharging into a surface condenser 22, an absolute pressure of approximately 25 to 30 mm. is maintained within the cooling zone. Thereby the steam condensate deposited upon the adsorbent within the desorption zone is evaporated and cooling of the adsorbent is effected, preferably to a temperature of from 60 to 80° F. If desired, further purging of the adsorbent within the cooling zone may be performed by admission of a controlled amount of gas from the line 5 through a line 23 to said zone. The line 23 is provided with a flow control valve 24. If it is found that the amount of condensate deposited upon the adsorbent within the desorption zone is insufficient to effect adequate cooling by evaporation within the cooling zone, distilled water in controlled amount may be delivered through a line 25 to the steam supply line 11. Line 25 is provided with a flow control valve 26.

A seal-forming means similar in general to those previously described herein is provided at the lower end of the cooling chamber. This means includes a vertical conduit 6b to receive the cooled adsorbent. A rotary star valve 28 is substituted for the damper of the previously described seals and is continuously operated at a constant rate by a motor M. At its lower end the conduit is in delivery connection with the adsorption zone at approximately the point of injection of the gaseous charge from the line 1. Owing to the fact that maintenance of a relatively high pressure differential between the adsorption zone and the cooling zone is required and owing also to the fact that the higher pressure is at the lower end of the column of adsorbent within the conduit 6b, the latter is made relatively long to contain a column say, 70 feet high. A column of such height will make an adequate seal and prevent passage of charge gas upwardly to the cooling zone. An indicating device 8b is connected to the lower portion of the casing of the separator 19 to indicate the level of the adsorbent accumulated within the conduit 6b and the casing. When said level falls, additional adsorbent is supplied to the system, as will be explained hereinafter.

Provision is made for recovering adsorbent discharged from the separators 4 and 9 and also for recovering gas evacuated from the cooling zone. Gas discharge line 5, from the separator 4, delivers to the lower portion of a scrubbing unit 29 provided with internal baffles 30. A suitable liquid such as water, for example, is introduced into the upper portion of the scrubber through the line 31. The gas flows upwardly counter to the descending water and is scrubbed thereby and discharged through the line 32. The latter has a pressure control valve 33. This valve is set to maintain the required pressure within the adsorption zone, the line 32 being connected to said zone through the scrubber 29 and the line 5. Gas line 14 introduces gaseous medium from the separator 9 to the lower portion of a scrubber 34 similar to scrubber 29 and also supplied with water from the line 31. The scrubbed gas escapes through the line 35, and into a condenser 36. From the latter the condensate and a non-condensible component of the gas are passed by a line 37 into a suction tank 38, and the condensate is discharged through a valved bottom line 39 from said tank.

The used scrubbing water collecting at the bottom of the scrubbers and containing recovered adsorbent is discharged through lines 40 and 41, subject to operation of float-controlled valves 42 and 43 in said lines respectively, and thence to a line 44 which delivers the water to a circulating tank 45. Water is passed through a bottom line 46 from said tank to a pump 47 which delivers the water into a centrifugal clarifier 48. A separated sludge of water and recovered adsorbent is discharged from the clarifier into a conveyor 49. The latter may be of any suitable type, such as an enclosed chain conveyor, for example. The conveyor delivers the sludge to a chute tube 50 which charges the sludge into the conveyor 10a leading to the cooling zone. Through a line 50a leading to said chute additional adsorbent may be supplied to the system when the necessity for such supply is indicated by the level indicator 8b associated with the separator 19. Clarified water is discharged by the clarifier 48 through a line 48a having a branch 51 leading to the suction side of a pump 52. Said pump delivers the water to the tank 45 through a line 53. When desired, water may be discharged from the system in controlled amounts by operation of a valve 54 located in the line 48a beyond the connection of the branch line 51. Make-up water may be supplied through a valved line 55 connected to the line 53 leading to the tank 45. A line 56 conducts water from the tank 45 to a pump 57 which delivers the water through a line 58 to the line 31 which supplies water to the scrubbers 29 and 34. Line 58 is provided with a flow-control valve 59.

A line 60 conducts the scrubbed gas from the suction tank 38 to the suction side of a compressor 61 and the latter forces the gas into a condenser 62. A line 63 conducts condensate and uncondensed gas to a tank 64. From the latter the condensate is discharged as a desired end product, through a line 65, subject to operation of a float-controlled valve 66 in said line.

Gaseous medium withdrawn from the cooling zone through the line 20 and the ejector 21 is passed as condensate and uncondensed gas from the condenser 22 through a line 67 to a tank 68. A bottom line 69 conducts the condensate from tank 68 to the inlet of a pump 70. Said pump delivers the condensate, which is mainly water, through a line 71 to the water line 44 leading from the scrubbers to the tank 45. Delivery of water through the line 71 is controlled by a float-controlled valve 72. Uncondensed gas is passed from the tank 68 through a line 73 and a steam jet ejector 74 which forces the gas through a line 75 and a barometric jet condenser 76 for condensing the ejector steam. Uncondensed gas is withdrawn from the jet condenser through a line 77 having a blower 78, and leading to the charge line 1. A valved line 79 conducts gas from the tank 64 also to the line 77 at a point between the jet condenser and the blower and the blower forces the gas from both sources into the charge line.

It will be seen that the invention provides, in a continuous adsorption system, for efficient and economical temperature conditioning of the adsorbent for the adsorption and desorption steps, by direct heat exchange. Thereby great economy is obtained in cost of plant equipment, maintenance, heat input and circulation of temperature-conditioning fluid. It will be seen also that the invention provides highly efficient recovery features for cooperation with the direct thermal conditioning features.

It is, of course, to be understood that the above description is merely illustrative and in no wise limiting and that I intend to comprehend within this invention such modifications as are included within the scope of the following claims.

I claim:

1. In a continuous adsorption process wherein contact is effected between a gaseous mixture and a solid adsorbent in a divided state within an adsorption zone, for adsorption of a component of said mixture and wherein the adsorbent is continuously passed after such contact, from the adsorption zone to a desorption zone and a cooling zone in succession, the improvement including the steps of introducing a hot vapor to the adsorbent within the desorption zone to effect desorption and cause deposit of a condensate of the vapor upon the adsorbent, establishing a low pressure condition within said cooling zone to effect evaporation of said condensate and consequent cooling of the adsorbent, and continuously passing the cooled adsorbent from the cooling zone to the adsorption zone.

2. In an adsorption process wherein contact is effected between a gaseous mixture and a solid adsorbent in a divided state within an adsorption zone, for adsorption of a component of said mixture, and wherein the adsorbent is passed, after such contact, from the adsorption zone to a desorption zone and a cooling zone in succession, the improvement including the steps of introducing a hot vapor to the adsorbent within the desorption zone to effect desorption and cause deposit of a condensate of the vapor upon the adsorbent, passing the adsorbent from the desorption zone to a cooling zone, and establishing a low pressure condition within said cooling zone to effect evaporation of said condensate and consequent cooling of the adsorbent.

3. In an adsorption process wherein contact is effected between a gaseous mixture and a solid adsorbent in a divided state within an adsorption zone, for adsorption of a component of said mixture, and wherein the adsorbent is passed after such contact from the adsorption zone to a desorption zone and a cooling zone in succession, the improvement including the steps of introducing a hot vapor to the adsorbent within the desorption zone to effect desorption and cause deposit of a condensate of the vapor upon the adsorbent, establishing a low pressure condition within said cooling zone to cause evaporation of said condensate and consequent cooling of the adsorbent, passing the cooled adsorbent from the cooling zone to the adsorption zone, and constraining the adsorbent, in each of said passages thereof from zone to zone, to form a gravity-packed sealing mass thereof preventing exchange of gas between the zones.

4. In an adsorption process wherein contact is effected between a gaseous mixture and a solid adsorbent in a divided state within an adsorption zone, for adsorption of a component of said mixture, and wherein the adsorbent is heated after such contact to effect desorption and is subsequently cooled and reemployed for contact, the improvement including the steps of passing the adsorbent, after such contact within the adsorption zone, to a desorption zone and there introducing a hot vapor to the adsorbent to effect desorption and cause deposit of a condensate of the vapor upon the adsorbent, passing the adsorbent from the desorption zone to a cooling zone, establishing a low pressure condition within said cooling zone to effect evaporation of said condensate and consequent cooling of the adsorbent, passing gaseous media from the adsorption zone and the desorption zone and scrubbing them separately with a liquid, recovering sludge from the used scrubbing liquid and passing said sludge to the adsorbent passed from the adsorption zone to the desorption zone, recirculating the liquid freed from said sludge for reuse in said scrubbings, condensing a portion of the gaseous medium received from the desorption zone and so scrubbed, passing an uncondensible portion of said medium to the adsorption zone, passing gaseous medium from the cooling zone, condensing a portion of the last-mentioned medium, and passing an uncondensible portion thereof to the adsorption zone.

5. In an adsorption process wherein contact is effected between a gaseous mixture and a solid adsorbent in a divided state within an adsorption zone for adsorption of a component of said mixture, and wherein the adsorbent is heated after such contact to effect desorption and is subsequently cooled and reemployed for contact, the improvement including the steps of passing the adsorbent, after such contact within the adsorption zone, to a desorption zone and there introducing a hot vapor to the adsorbent to effect desorption and cause deposit of a condensate of the vapor upon the adsorbent, passing the adsorbent from the desorption zone to a cooling zone, establishing a low pressure condition within said cooling zone to effect evaporation of said condensate and consequent cooling of the absorbent, passing gaseous media from the adsorption zone and the desorption zone and scrubbing them separately with a liquid, recovering sludge from the used scrubbing liquid and passing said sludge to the adsorbent passed from the adsorption zone to the desorption zone, recirculating the liquid freed from said sludge for reuse in said scrubbings, condensing a portion of the gaseous medium received from the desorption zone and so scrubbed, and passing an uncondensible portion of such medium to the adsorption zone.

6. The improved steps for a gas adsorption process of the type wherein a solid adsorbent in a divided state is passed through an adsorption zone, a desorption zone and a cooling zone in succession, said steps comprising supplying heat to desorb the adsorbed gas by introducing to the desorption zone a hot vapor, forming a suspension of the adsorbent within the desorbed gas, controlling the temperature and pressure within the desorption zone to obtain a substantial deposit of condensate of the vapor upon the adsorbent, separating the suspended adsorbent from the gas, creating a reduced pressure within the cooling zone and thereby cooling the adsorbent for reuse by evaporating liquid deposit thereon and forming a suspension of the adsorbent in the resulting vapor, and separating the suspended adsorbent from said vapor.

7. The improved steps for a gas adsorption process of the type wherein a solid adsorbent in a divided state is passed through an adsorption zone, a desorption zone and a cooling zone in succession, said steps comprising supplying heat to desorb the adsorbed gas by introducing to the desorption zone a hot vapor, forming a suspension of the adsorbent within the desorbed gas and a deposit of condensate of the vapor upon the adsorbent, separating the suspended adsorbent from the gas, supplementing said deposit by introduction of liquid in controlled amount to the desorption zone, creating a reduced pressure within the cooling zone and thereby cooling the adsorbent for reuse by evaporating liquid deposit thereon and forming a suspension of the adsorbent in the resulting vapor, and separating the suspended adsorbent from said vapor.

8. The improved steps for a gas adsorption process of the type wherein a solid adsorbent in a divided state is continuously passed through an adsorption zone, a desorption zone and a cooling zone in succession and back to the adsorption zone wherein contact is effected between a gaseous mixture and the adsorbent for adsorption of a component of the mixture, said steps comprising supplying heat to desorb the adsorbed gas by introducing to the desorption zone a hot vapor, forming a suspension of the adsorbent within the desorbed gas and a deposit of condensate of the vapor upon the adsorbent, separating the suspended adsorbent from the gas, supplementing said deposit by introduction of liquid in controlled amount to the desorption zone, maintaining a reduced pressure within the cooling zone and thereby cooling the adsorbent by evaporating liquid deposit thereon and forming a suspension of the adsorbent in the resulting vapor, separating the suspended adsorbent from said vapor, and introducing to the cooling zone a controlled amount of an unadsorbed component of the gaseous mixture from the adsorption zone to thereby control the degree of evaporation of said liquid deposit.

9. The improved steps for a gas adsorption process of the type wherein a solid adsorbent in a divided state is passed through an adsorption zone, a desorption zone and a cooling zone in succession and back to the adsorption zone wherein contact is effected between a gaseous mixture and the adsorbent for adsorption of a component of the mixture, said steps comprising supplying heat to desorb the adsorbed gas by introducing to the desorption zone a hot vapor, forming a suspension of the adsorbent within the desorbed gas and a deposit of condensate of the vapor upon the adsorbent, separating the suspended adsorbent from the gas, creating a reduced pressure within the cooling zone and thereby cooling the adsorbent for reuse by evaporating liquid deposit thereon and forming a suspension of the adsorbent in the resulting vapor, separating the suspended adsorbent from said vapor, and introducing to the cooling zone a controlled amount of an unadsorbed component of the gaseous mixture from the adsorption zone to thereby control the degree of evaporation of said liquid deposit.

10. The steps for a gas adsorption process claimed in claim 6 with the additional steps of passing the cooled adsorbent from the cooling zone back to the adsorption zone, and constraining the adsorbent, in each passage thereof from zone to zone, to form a gravity-packed sealing mass thereof preventing exchange of gas between the zones.

11. The improved steps for a gas adsorption process of the type wherein a solid adsorbent in a divided state is passed through an adsorption zone, a desorption zone and a cooling zone in succession, said steps comprising supplying heat to desorb the adsorbed gas by introducing to the desorption zone a hot vapor, forming a deposit of condensate of said vapor upon the adsorbent, supplementing said deposit by introduction of liquid in controlled amount to the desorption chamber, and creating a reduced pressure within the cooling zone and thereby cooling the adsorbent for reuse by evaporation of liquid deposit thereon.

12. In an adsorption process wherein contact is effected between a gaseous mixture and a solid adsorbent in a divided state within an adsorption zone, for adsorption of a component of said mixture, and wherein the adsorbent is heated after such contact to effect desorption and is subsequently cooled and reemployed for contact, the improvement including the steps of passing the adsorbent, after such contact within the adsorption zone, to a desorption zone and there introducing a hot vapor to the adsorbent to effect desorption and cause deposit of a condensate of the vapor upon the adsorbent, passing the adsorbent from the desorption zone to a cooling zone, establishing a low pressure condition within said cooling zone to effect evaporation of said condensate and consequent cooling of the adsorbent, passing gaseous media from the adsorption zone and the desorption zone and scrubbing them separately with a liquid, recovering sludge from the used scrubbing liquid and passing said sludge to the adsorbent passed from the adsorption zone to the desorption zone, condensing a portion of the gaseous medium received from the desorption zone and so scrubbed, and passing an uncondensible portion of said medium to the adsorption zone.

13. In an adsorption process wherein contact is effected between a gaseous mixture and a solid adsorbent in a divided state within an adsorption zone, for adsorption of a component of said mixture, and wherein the adsorbent is heated after such contact to effect desorption and is subsequently cooled and reemployed for contact, the improvement including the steps of passing the adsorbent, after such contact within the adsorption zone, to a desorption zone and there introducing a hot vapor to the adsorbent to effect desorption and cause deposit of a condensate of the vapor upon the adsorbent, passing the adsorbent from the desorption zone to a cooling zone, establishing a low pressure condition within said cooling zone to effect evaporation of said condensate and consequent cooling of the adsorbent, passing a minor portion of an unadsorbed component of said mixture from the adsorption to the cooling zone, passing a major portion of said unadsorbed component from the adsorption zone and scrubbing it with a liquid, passing gaseous media from the desorption zone and separately scrubbing it with a liquid recovering sludge from the used scrubbing liquid from said two scrubbing steps and passing said sludge to the adsorbent passed from the adsorption zone to the desorption zone, condensing a portion of the gaseous medium received from the desorption zone and so scrubbed, and passing an uncondensible portion of said medium to the adsorption zone.

14. Apparatus for an adsorption system of the type wherein a solid adsorbent in a divided state is passed through an adsorption zone, a desorption zone and a cooling zone in succession, said apparatus including a desorption chamber having an adsorbent delivery conduit portion in receiving connection with the adsorption zone, and a portion opening into said conduit portion to receive the adsorbent for separation thereof from desorbed gas and having an outlet conduit for the gas and an outlet for the adsorbent; means for delivering hot vapor to said conduit portion at a point materially spaced from the connection of said conduit portion with said separating portion of the chamber; valve means to control discharge of gas through said gas outlet conduit and retain a predetermined pressure in the desorption chamber; a cooling chamber also having an adsorbent delivery conduit portion in receiving connection with said desorption chamber and a portion opening into the conduit portion to receive the adsorbent for separation thereof from vapor and having an outlet conduit for the vapor and an outlet for the adsorbent; and suction means connected to said vapor outlet conduit to create low pressure in the cooling chamber.

15. The apparatus claimed in claim 14, and including means to deliver a liquid into the said separating portion of the desorption chamber.

16. The apparatus claimed in claim 14, and including upstanding adsorbent delivery conduits arranged respectively to deliver the adsorbent from the adsorption zone to the desorption chamber, from the latter to the cooling chamber and from the cooling chamber back to the adsorption zone, and means to control passage of the adsorbent through each of said conduits to maintain therein a gravity-packed sealing column of the adsorbent.

17. The apparatus claimed in claim 14, and including means for delivering a controlled amount of unadsorbed gas from the adsorption zone to the cooling chamber.

AUGUST HENRY SCHUTTE.

REFERENCES CITED

The following references are of record in the file of this patent:

UNITED STATES PATENTS

| Number | Name | Date |
|---|---|---|
| 1,577,534 | Miller | Mar. 23, 1926 |
| 1,616,547 | Pontoppidan | Feb. 8, 1927 |
| 1,758,398 | Hasche | May 14, 1930 |
| 1,836,301 | Bechthold | Dec. 15, 1931 |
| 2,009,569 | Wallis | July 30, 1935 |
| 2,247,594 | Bayerl | July 1, 1941 |
| 2,270,903 | Rudbach | Jan. 27, 1942 |
| 2,340,398 | MacMullin | Feb. 1, 1944 |
| 2,397,566 | Schutte | Apr. 2, 1946 |